US000001545H

United States Statutory Invention Registration [19]

[11] Reg. Number: H1545

[45] Published: Jun. 4, 1996

Plichta et al.

[54] OXYHALIDE ELECTROCHEMICAL CELL INCLUDING AN ALKALI METAL INTERCALATED CARBON AS THE ANODE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 340,925

[22] Filed: Nov. 17, 1994

[51] Int. Cl.[6] ..... H01M 6/00; H01M 10/00

[52] U.S. Cl. ..... 429/122; 429/194; 429/196; 429/197; 429/199; 429/218; 429/233; 429/245

[58] Field of Search ..... 429/194, 196, 429/197, 199, 218, 233, 245

[56] References Cited

U.S. PATENT DOCUMENTS 4,707,423 11/1987 Kalnin et al. ..... 429/194
4,752,540 6/1988 Chua et al. ..... 429/194
5,028,500 7/1991 Fong et al. ..... 429/194
5,352,546 10/1994 Chua et al. ..... 429/196

*Primary Examiner*—Charles T. Jordan
*Assistant Examiner*—Meena Chelliah
*Attorney, Agent, or Firm*—Michael Zelenka; Roy E. Gordon

[57] ABSTRACT

An oxyhalide electrochemical cell is provided including an alkali metal intercalated carbon as the anode, a high surface area carbon black as the cathode, and a solution of an alkali metal salt in an oxyhalide solvent as the electrolyte.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

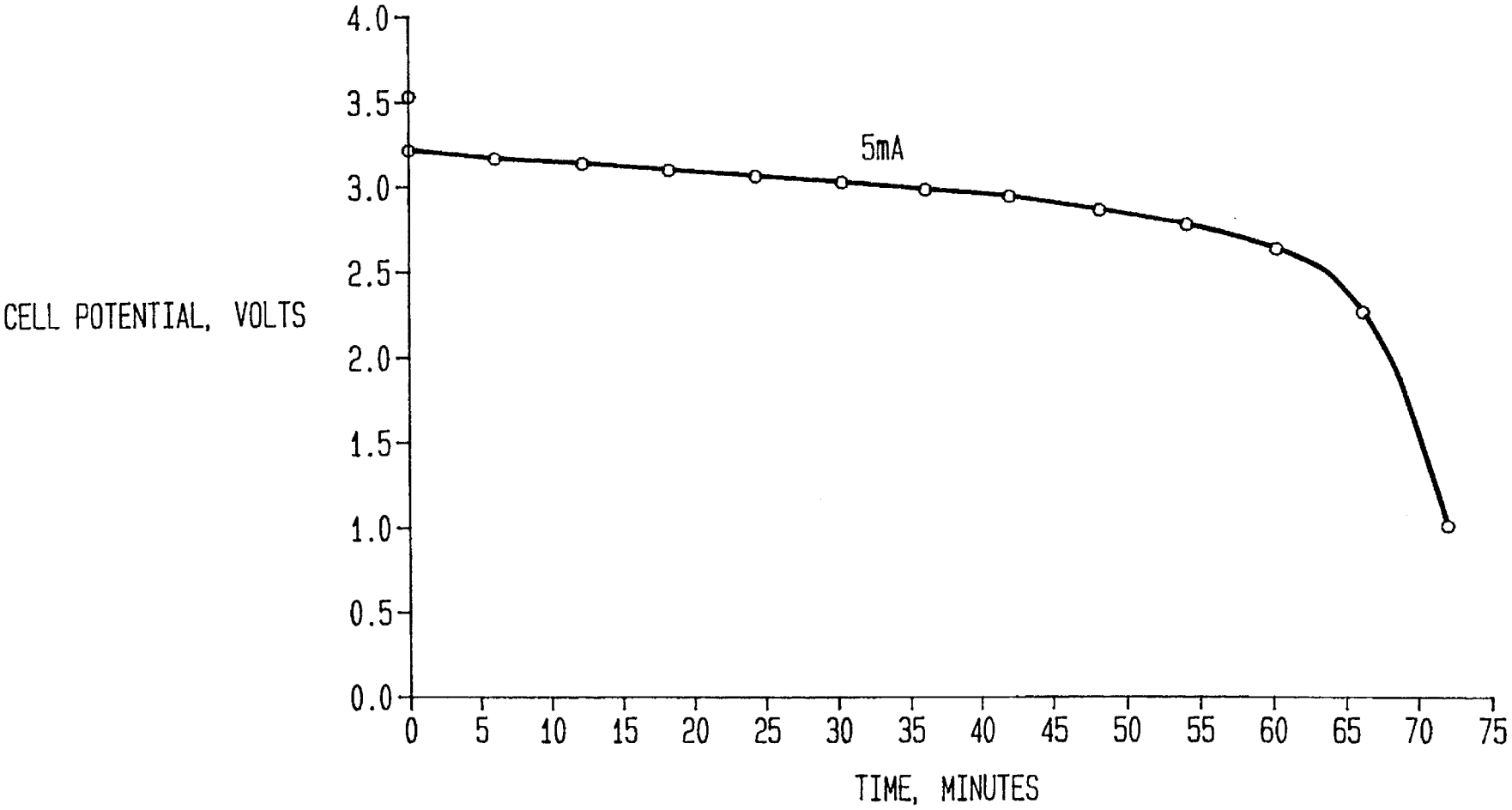
5mA
CELL POTENTIAL, VOLTS
4.0
3.5
3.0
2.5
2.0
1.5
1.0
0.5
0.0
0
5
10
15
20
25
30
35
40
45
50
55
60
65
70
75
TIME, MINUTES

OXYHALIDE ELECTROCHEMICAL CELL INCLUDING AN ALKALI METAL INTERCALATED CARBON AS THE ANODE

GOVERNMENT INTEREST

The invention described herein may be manufactured, used, and licensed by or for the Government for governmental purposes without the payment to us of any royalties thereon.

FIELD OF INVENTION

The invention relates in general to oxyhalide electrochemical cells, and in particular, to oxyhalide electrochemical cell that include an alkali metal intercalated carbon as the anode.

BACKGROUND OF THE INVENTION

Alkali metal/oxyhalide chemistries and in particular, lithium/oxyhalide chemistries offer high energy densities and are capable of high current densities. Typically, these cells consist of a lithium or calcium metal anode and a high surface area carbon cathode, that acts as the depolarizer for the reduction of the oxyhalide solvent in the electrolyte. However, although these cells offer excellent electrochemical performance, they suffer from inherent safety problems brought about by the use of the reactive lithium metal anodes. Safety studies on the cell components in lithium/oxyhalide cells associated the safety problems with runaway type reactions with the lithium metal anode that resulted in cell explosions under abuse test conditions. In addition to the safety concerns, the lithium metal anodes suffered from electrochemical passivation after storage, that results in cell voltage delays and reduces performance. Finally, the use of lithium or calcium metals as anodes in these cells makes fresh cells a hazardous waste and therefore expensive to dispose of safely.

SUMMARY OF THE INVENTION

The general object of this invention is to provide an oxyhalide electrochemical cell in which the aforementioned difficulties are overcome. A more particular object of the invention is to provide such an oxyhalide electrochemical cell that does not require the use of alkali metals as the anode, and that provides safe operation and excellent performance with no cell voltage delay.

It has now been found that the aforementioned object can be attained by using an alkali metal intercalated carbon as the anode in the oxyhalide electrochemical cell. The cell also uses a high surface area carbon black as the cathode and a solution of an alkali metal salt in an oxyhalide solvent as the electrolyte.

That is, high temperature molten salt cells can be made that use an alkali metal petroleum coke as for example, a lithiated petroleum coke as the anode that provides significant cell cycling at cell voltages similar to those obtained using more costly lithium metal alloy anodes. "Petroleum coke" as the term is used herein refers to a petroleum based carbon black.

DESCRIPTION OF THE PREFERRED EMBODIMENT

A 1 cm×1 cm graphite electrode is made using a 90 weight percent graphite and 10 weight percent Teflon mixture that is roll pressed onto an expanded nickel grid followed by vacuum drying at 100° C. for 48 hours. The graphite electrode is intercalated with lithium via electrochemical reduction versus a lithium metal electrode in an electrolyte consisting of a one molar concentration of $LiAsF_6$ in dimethyl carbonate. The graphite electrode is intercalated with lithium at 1 mA current (0.17 mA/cm$^2$) to a cell voltage versus lithium of 0.02 volts. The degree of lithiation is 90% that corresponds to the phase $LiC_6$ and a lithium capacity of 23.1 mAh or 0.33 Ah/g. The intercalated graphite electrode is then rinsed with pure dimethyl carbonate to remove the $LiAsF_6$ salt and dried under vacuum to remove the organic solvent. The lithium intercalation of the graphite can also be done by chemically reacting the graphite in molten lithium metal. The 1 cm=1 cm cathode for the oxyhalide cell is fabricated using a 90 wt% high surface area carbon (shawinigan black) and 10 wt% Teflon mixture that is roll pressed onto an expanded nickel grid followed by vacuum drying at 100° C. for 48 hours. A control cell using a similar cathode versus lithium metal in an electrolyte of 1.5 M $LiAlCl_4$ in thionyl chloride determines the cathode capacity to be 41.3 mAh or 2.3 Ah/g for the 5 mA rate (5 mA/cm$^2$). The oxyhalide electrolyte is prepared as 1.5 molar $LiAlCl_4$ in thionyl chloride. The lithiated graphite anode and shawinigan black carbon cathode are sandwiched between a single layer of glass fiber separator, that acts as a wick for the electrolyte. The cell is held in compression through the use of two glass slides and Teflon clips. The assembled cell is contained in a Pyrex glass pressure vessel affixed with Viton O-ring seals and electrical feed throughs. The cell is filled with the oxyhalide electrolyte and operated in an electrolyte starved condition. The intercalated graphite electrode handling and preparation as well as the oxyhalide cell construction is done in an argon filled dry box that is maintained at <0.5 ppm water. The electrolyte is prepared, and the cell filled in a dry room controlled to <1% relative humidity.

DESCRIPTION OF THE DRAWING

FIG. 1 shows the discharge obtained for the $LiC_6$/1.5 M $LiAlCl_4$ in thionyl chloride/(shawinigan black) cell just described.

Referring to FIG. 1, the cell open circuit voltage is 3.52 volts. Galvanostatic discharge at (5mA/cm$^2$) to a cell potential of 1 volt results in 6.5 mAh cell capacity at an average cell potential of 2.95 volts. The cell results are not optimized due to the electrolyte starved conditions used. No voltage delay is seen for the cell during discharge from the open circuit potential at a temperature of 25° C. It is expected that even after long term storage, no cell voltage delay will be observed since lithiated carbon does not form the passivating films typical for lithium metal.

Other cathodes can be used in the oxyhalide cells in lieu of shawinigan black such as those carbons known as high surface area carbon blacks, graphite, petroleum cokes, charcoals, soots, and fullerenes. Additional additives to the cathode can also be used to enhance the catalytic reduction of the oxyhalide.

Other oxyhalides can be used in lieu of thionyl chloride such as $SO_2Cl_2$, $POCl_3$, $CSCl_2$, $CH_3CClO$, $Si_2OCl_6$, $P_2O_3Cl_4$, and $S_2O_5Cl_2$.

Other electrolyte salts can also be used in lieu of $LiAlCl_4$ such as $LiBCl_4$, $Li_2B_{10}Cl_{10}$, and $Li_2B_{12}Cl_{12}$.

The theoretical energy density of the $LiC_6$/1.5 M $LiAlCl_4$ in thionyl chloride/C (shawinigan black) cell based on the following cell reaction, $4LiC_6+2SOCl_2 \rightarrow S+SO_2+4LiCl+24C$, and a cell potential of 3.5 volts is 677 Wh/kg.

We wish it to be understood that we do not desire to be limited to the exact details of construction shown and described for obvious modifications will occur to a person skilled in the art.

What is claimed is:

1. An oxyhalide electrochemical cell including an alkali metal intercalated carbon as the anode.

2. An oxyhalide electrochemical cell according to claim 1 wherein the alkali metal is lithium.

3. An oxyhalide electrochemical cell according to claim 1 wherein the alkali metal is calcium.

4. An oxyhalide electrochemical cell according to claim 1 wherein the carbon is a high surface area carbon black.

5. An oxyhalide electrochemical cell according to claim 4 wherein the high surface area carbon black is selected from the group consisting of graphite, petroleum coke, charcoals, soots, and fullerenes.

6. An oxyhalide electrochemical cell according to claim 5 wherein the high surface area carbon black is graphite.

7. An oxyhalide electrochemical cell including an alkali metal intercalated carbon as the anode, a high surface area carbon black as the cathode, and a solution of an alkali metal salt in an oxyhalide solvent as the electrolyte.

8. An oxyhalide electrochemical cell according to claim 7 wherein the alkali metal of the anode is selected from the group consisting of lithium and calcium, the intercalated carbon of the anode is selected from the group of carbons consisting of graphite, petroleum coke, carbon black, charcoals, soots, and fullerenes, wherein the high surface area carbon black of the cathode is selected from the group consisting of graphite, petroleum coke, charcoals, soots, and fullerenes, wherein the alkali metal salt is a lithium salts selected from the group consisting of $LiAlCl_4$, $LiBCl_4$, $Li_2B_{10}Cl_{10}$ and $Li_2B_{12}Cl_{12}$, and wherein the oxyhalide solvent is an oxychloride solvent selected from the group consisting of $SOCl_2$, $SO_2Cl_2$, $POCl_3$, $CSCl_2$, $CH_3CClO$, $Si_2OCl_6$, $P_2O_3Cl_4$, and $S_2O_5Cl_2$.

9. An oxyhalide electrochemical cell according to claim 8 wherein the lithium intercalated carbon anode is $LiC_6$, wherein the carbon cathode is shawinigan black, and wherein the electrolyte is a solution of $LiAlCl_4$ in $SOCl_2$.

* * * * *